April 29, 1969         J. V. KOSKI         3,441,297
TUBE COUPLING
Filed Nov. 6, 1967
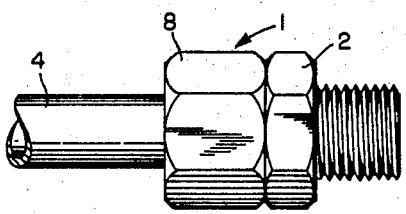
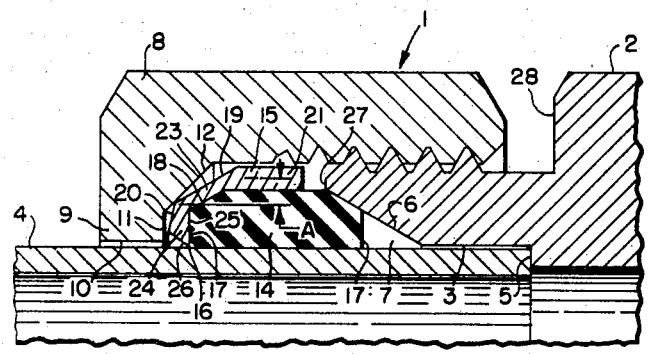
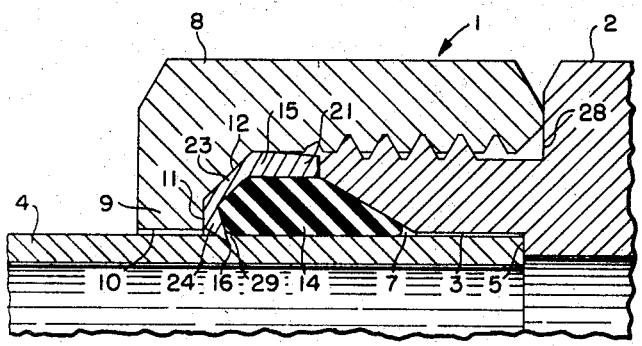
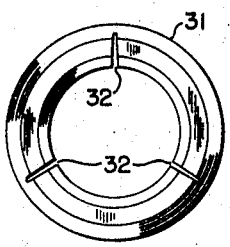
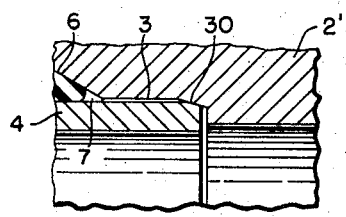
INVENTOR
JERRY V. KOSKI
BY
Oberlin, Maky, Donnelly & Renner
ATTORNEYS United States Patent Office 3,441,297
Patented Apr. 29, 1969

3,441,297
TUBE COUPLING
Jerry V. Koski, Parma, Ohio, assignor to Parker-Hannifin Corporation, Cleveland, Ohio, a corporation of Ohio
Filed Nov. 6, 1967, Ser. No. 680,789
Int. Cl. F16l 19/06, 21/02, 17/00
U.S. Cl. 285—342
10 Claims

ABSTRACT OF THE DISCLOSURE

Tube coupling wherein axial space around tube between relatively movable coupling members contains a gripping and sealing unit comprising a gripping ring which, upon relative movement of said members toward each other, is radially contracted at one end by one member into firm gripping engagement with the tube while its other end is in abutting engagement with the other member; and a rubber-like sealing ring within said gripping ring squeezed by radial contraction of said one end of the gripping ring into fluid-tight sealing engagement with said tube and with said other member, said sealing ring being confined by the gripping ring against extrusion, even under conditions of extremely high fluid pressures, by reason of the abutting and gripping engagement of the gripping ring with said other member and with said tube.

Background of the invention

In known tube couplings employing a rubber-like sealing ring and a metallic gripping ring, the relative movement of the coupling members toward each other entails squeezing of the sealing ring between the coupling members or between one coupling member and the gripping ring whereby the sealing ring is subjected to a high degree of compressive stress in order to effect deformation of the gripping ring into gripping engagement with the tube. Moreover, the sealing ring, when subjected to such severe compression during assembly and when subjected to high fluid pressures during use, is apt to be damaged by extrusion into gaps or crevices between the coupling members and the tube and/or between the gripping ring and the coupling members. In such known couplings, the gripping ring is usually of split or slotted construction to render it more readily contractible into gripping engagement with the tube but, here again, the sealing ring is apt to be pinched in the gripping ring slots during assembly of the coupling.

Summary of the invention

Contrary to the foregoing, the tube coupling herein has a gripping ring which surrounds the rubber-like sealing ring and which is radially contracted at one end into gripping engagement with the tube by movement of one coupling member toward the other while the other end is in abutting engagement with the other coupling member. The deformation of such one end of the gripping ring effects displacement of the sealing ring under modest compression into fluid-tight sealing engagement with said other coupling member and with the tube.

One object of the present invention is to provide a tube coupling of the character indicated wherein initial movement of the coupling members toward each other effects engagement of one end of the gripping ring and of the sealing ring with one coupling member, and wherein continued movement of the coupling members toward each other effects radial contraction of the other end of the gripping ring by the other coupling member into gripping engagement with the tube while such one end of the gripping ring is in firm abutting engagement with said one coupling member, such deformation of the gripping ring being effective to displace the sealing ring into fluid-tight engagement with said one coupling member and with said tube.

It is another object of this invention to provide a tube coupling of the character indicated wherein the abutting engagement of said gripping ring with said one coupling member and the gripping engagement of said gripping ring with the tube confines the sealing ring so that even under extreme fluid pressure conditions there are no gaps or crevices for extrusion of the sealing ring.

It is another object of this invention to provide a tube coupling of the character indicated in which the gripping ring has a tubular portion at one end for abutting engagement with one coupling member and for exposing one end of the sealing ring therewithin for fluid-tight engagement with said one coupling member, and a radially inwardly extending flange portion at its other end which is adjacent the other end of said sealing ring and which is deformed by the other coupling member into gripping engagement with the tube.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Brief description of the drawing

FIG. 1 is a side elevation view of a tube coupling assembly embodying the present invention;

FIGS. 2 and 3 are much enlarged fragmentary cross-section views respectively illustrating the tube coupling assembly before and after tightening the nut member;

FIG. 4 is a fragmentary cross-section view illustrating a modified form of tube end locating surface in the body member which permits axial movement of the tube during tightening of the nut member; and FIG. 5 is a rear elevation view of a slotted gripping ring such as may be used with coupling members of plastic or like materials.

Discussion of the invention

As shown in the drawing, the tube coupling assembly 1 herein illustrated, comprises a body member 2 which is counterbored at 3 to receive a tube 4 and to provide a stop shoulder 5, said counterbore 3 being flared as shown at 6 to define with the surface of the tube 4 a wedge-shaped annular space 7.

In threaded engagement with said body member 2 is a nut member 8 having at its axially outer end a radially inturned flange 9 having a bore 10 through which the tube 4 is inserted into the body member 2. The axially inner face of said nut flange 9 comprises a plane portion 11 and a frusto-conical face portion 12.

In the annular space around the tube 4 and between the body and nut members 2 and 8 is a sealing ring 14 of rubber-like material and a metallic gripping ring 15 therearound which preferably has a tube biting edge 16 harder than the tube 4.

The sealing ring 14 in its undeformed condition (see FIG. 2) has a bore therethrough of substantially the same diameter as the tube 4 and has plane annular ends 17 with beveled outer corners to match the flare mouth 6 and the frusto-conical inner face 18 of the gripping ring 15. Preferably, the outside diameter of the sealing ring 14 is, as shown in FIG. 2, less than the maximum diameter of the flare mouth 6 and approximately the same as the inside diameter of the gripping ring 15 so as to be a snug fit in the gripping ring 15. Thus, the parts 14 and 15 are held together to constitute a sealing and gripping unit.

In the untightened condition of the assembly 1 wherein the nut member 8 just engages the gripping ring 15 to urge it and the sealing ring 14 so that the beveled ends of the sealing ring 14 contact the bevels 6 and 18, the frusto-conical face 12 of the nut member 8 has line contact with the intersection of the beveled faces 19 and 20 at the axially outer end of the gripping ring 15.

The axially inner end portion 21 of the gripping ring 15 is of relatively thick radial cross-section size to render that portion substantially undeformable, whereas the beveled axially outer end portion 23 of the gripping ring 15 is of substantially thinner radial cross-section. For example, the beveled portion 23 of the gripping ring 15 may be of radial cross-section thickness about one-half the radial thickness of the axially inner end portion 21. The apex angle of the beveled portion 23 i.e. the faces 18 and 19 of the gripping ring is substantially less than the apex angle of the frusto-conical inner surface 12 of the nut flange 9 to achieve the aforesaid initial line contact which is spaced radially inward of the end portion 21 of the gripping ring 15.

The axially outer end portion 23 of the gripping ring 15 terminates in a radially inwardly extending flange portion 24 which is constituted by the plane inner face 25 to engage the plane outer end face 17 of the sealing ring 14 and by the beveled face 20 which, when the gripping ring 15 is deformed as shown in FIG. 3, substantially matches the plane inner face 11 of the nut flange 9.

The axially outer end portion 23 of the gripping ring 15 is countersunk as at 26 to provide an acute angle biting edge 16 which bites into outer surface of the tube 4 as the nut member 8 is tightened as in FIG. 3. By reason of the provision of the plane and beveled faces 25 and 20 of the gripping ring 15, it is noted that in the tightened condition of the tube coupling assembly 1, the gripping ring is of maximum axial thickness at the biting edge 16 so as to provide great strength against mechanical pull-out or fluid pressure blow out of the tube 4.

As the nut member 8 is tightened, the first thing that occurs is that the nut member 8 and gripping ring 15 are advanced in unison (without detectable deformation of the latter) to urge the sealing ring 14 against the flare mouth 6 of the body member 2 and thus establish an initial seal thereat and between the sealing ring 14 and the tube 4. Such movement of the nut member 8 and gripping ring 15 in unison continues until the axially inner end of the gripping ring 15 engages the end 27 of the body member 2. Thereafter, as the nut member 8 is tightened the beveled portion 23 of the gripping ring 15 will be cammed or swung inwardly by force applied through an increasing moment arm A until the respective faces 12–19 and 11–20 match, as clearly shown in FIG. 3, at which time the coupling assembly 1 is in its fully tightened condition with the nut member 8 bottoming against the body shoulder 28. During the swinging in of the beveled end portion 23 of the gripping ring 15 from the FIG. 2 to the FIG. 3 position, the volume of the chamber in which the sealing ring 14 is disposed is decreased so as to impose additional compressive stress on the sealing ring 14 to cause the same to be displaced or deformed toward the apex of the triangular space 7 between the flare mouth 6 and the outer surface of the tube 4. The biting edge 16 bites into the tube 4 during such swinging movement and forms a strong grip to resist withdrawal of the tube 4 either by mechanical force or by the force exerted by fluid pressure in the coupling. In the FIG. 3 assembled condition of the coupling 1, the sealing ring 14 is firmly sealed against the outer surface of the tube 4 and against the flare mouth 6 to preclude leakage over a wide temperature range, since at sub-zero temperatures the sealing ring 14 in shrunk condition will yet be in fluid-tight engagement with the flare mouth 6 and with the tube 4 and, likewise, at elevated temperatures expansion of the sealing ring 14 is accommodated by the space that yet remains near the apex of the space 7.

In view of the intimate engagement of the biting edge 16 with the tube 4 and the abutting engagement of the inner end portion 21 of the gripping ring 15 with the end 27 of the body member 2, the sealing ring 14 is wholly contained in a space in which there are no gaps or crevices, and, therefore, even under extremely high fluid pressure conditions there is no place for extrusion of the sealing ring 14. Thus there is no movement or displacement of the sealing ring 14 under high fluid pressure pulses or shocks because the sealing ring 14 material has no place to go. It has been found that under extreme fluid pressure there is no perceptible outward movement of the tube 4, the grip being such that the tube 4 will expand and burst axially outward of the nut member 8. Under extreme fluid pressures the end portion 21 effectively resists expansion and, of course, the thinner deformable beveled portion 23 and the flange 24 are fully backed up by the nut flange 9.

When the tube 4 is of brittle or crumbly material, it may not be desirable to have the gripping ring 15 plow up a holding ridge 29 on the tube 4 as in FIG. 3. To eliminate or minimize such plowing action, the body member 2′ as shown in FIG. 4 may be modified to provide a wedge surface 30 engaged by the end of the tube 4 so that as the gripping ring 15 is being deformed by tightening of the nut member 8, the biting edge 16 will move axially and radially inwardly into frictional engagement with the tube 4 to cause the tube 4 to move along the wedge surface 30. Thus, the biting edge 16 will not in FIG. 4 plow up a ridge 29 as in FIG. 3 but will, instead, be pressed radially into firm frictional engagement with the tube 4.

In general use, the coupling 1 herein is intended for use in connection with metal tubes 4 and metal body and nut members 2 and 8. However, in the case of plastic body and nut members 2 and 8 used with plastic or metal tubing 4, the gripping ring 31 (see FIG. 5) will yet be preferably made of metal but in such application the gripping ring 31 may be of lighter weight construction and may be slotted as at 32 to facilitate deformation of the axially outer end portion thereof. The slots 32 may be designed so that they are closed when the coupling assembly 1 is tightened, thus to eliminate gaps into which the sealing ring 14 may be extruded under the influence of high fluid pressure.

I therefore particularly point out and distinctly claim as my invention:

1. A tube coupling assembly comprising body and nut members having screw threaded engagement with each other and defining an axial space therebetween and around a tube inserted therewithin; a gripping ring in said space having one end adapted to be brought into abutting engagement with said body member and the other end into camming engagement with said nut member whereby, upon screwing together of said members, said other end is deformed radially inwardly into gripping engagement with said tube; and a rubber-like sealing ring within said gripping ring urged into fluid-tight sealing engagement with said body member and tube by deformation of said gripping ring as aforesaid, said nut member having a radially inwardly extending flange adjacent said other end of said gripping ring, said flange having a frusto-conical axially inner face; said gripping ring having one end which is substantially cylindrical and radially spaced from said tube, and a radially inwardly beveled flange at said other end of less apex angle than said face which, upon screwing together of said members, is deformed by engagement with said face of said nut member to increased apex angle to move the inner extremity of said gripping ring flange radially and axially inwardly into gripping engagement with said tube, said frusto-conical face of said nut member flange terminating in a plane annular face; said beveled flange terminating in a substantially transverse portion the inner edge of which is moved as aforesaid into gripping engagement with the tube, and the axially outer face of said transverse flange portion being deformable into mating engagement with the plane annular face of said nut member to limit the extent of deformation of said gripping ring during screwing together of said members; said sealing ring being cylindrical and having an outer diameter approximately equal to the inner diameter of said one end of said gripping ring for receipt therein, said sealing ring extending axially beyond said one end of said gripping ring, said body member having a flare mouth, and said sealing ring having beveled radially outer corners for mating engagement with said flare mouth and said beveled flange, and annular ends for mating engagement with the axially inner face of said transverse flange portion.

2. A tube coupling assembly comprising body and nut members having screw threaded engagement with each other and defining an axial space therebetween and around a tube inserted therewithin; a gripping ring in said space having one end adapted to be brought into abutting engagement with said body member and the other end into camming engagement with said nut member whereby, upon screwing together of said members, said other end is deformed radially inwardly into gripping engagement with said tube; and a rubber-like sealing ring within said gripping ring urged into fluid-tight sealing engagement with said body member and tube by deformation of said gripping ring as aforesaid, said nut member having a radially inwardly extending flange adjacent said other end of said gripping ring, said flange having a frusto-conical axially inner face; said gripping ring having a radially inwardly beveled flange at said other end of less apex angle than said face which, upon screwing together of said members, is deformed by engagement with said face of said nut member to increased apex angle to move the inner extremity of said gripping ring flange radially and axially inwardly into gripping engagement with said tube, said one end of said gripping ring being substantially cylindrical and adapted to abut against the end of said body upon screwing of said members together prior to such deformation of said radially inwardly beveled flange of said gripping ring; said sealing ring being cylindrical and having an outer diameter approximately equal to the inner diameter of said one end of said gripping ring for receipt therein, said sealing ring extending axially beyond said one end of said gripping ring; and said body member having a flare mouth for wedging of said sealing ring between said flare mouth and said tube upon screwing of said members together.

3. The assembly of claim 2 wherein said sealing ring is confined against extrusion from said space by the abutting and gripping engagements of said gripping ring with said body member and tube.

4. The assembly of claim 3 wherein the extent of deformation of said gripping ring is limited by mating engagement of said nut member face and said beveled flange.

5. The assembly of claim 2 wherein said sealing ring has plane annular ends and beveled radially outer corners for mating engagement with the beveled flange of said gripping ring and said flare mouth.

6. The assembly of claim 2 wherein said frusto-conical face of said nut member flange terminates in a plane annular face; and said beveled flange terminates in a substantially transverse portion the inner edge of which is moved as aforesaid into gripping engagement with the tube, and the axially outer face of said transverse flange portion is deformed into mating engagement with the plane annular face of said nut member to limit the extent of deformation of said gripping ring during screwing together of said members.

7. The assembly of claim 6 wherein said transverse portion of said beveled flange is progressively axially thicker toward said inner edge to provide greater strength against mechanical pull-out and fluid pressure blow out of the tube.

8. The assembly of claim 2 wherein the inner edge of said beveled flange is countersunk to provide an acute angle biting edge which bites into the tube upon screwing of said members together as aforesaid.

9. The assembly of claim 8 further comprising a counterbore in said body radially inwardly of said flare mouth for receipt of the tube end, and a wedge surface at the inner end of said counterbore engageable by the tube end upon screwing of said members together to permit limited radial inward movement of said tube thus to substantially eliminate such biting of said biting edge into said tube.

10. The assembly of claim 2 wherein said beveled flange on said gripping ring has slots therein to facilitate such deformation thereof, said slots being of such a width so as to be substantially closed after such deformation thus to eliminate gaps into which said sealing ring may be extruded by high pressure.

References Cited

UNITED STATES PATENTS

| | | | |
|---|---|---|---|
| 2,460,621 | 2/1949 | Courtot | 285—341 X |
| 2,466,527 | 4/1949 | Wolfram | 285—382.7 X |
| 2,986,409 | 5/1961 | Weber | 285—342 X |
| 3,332,708 | 7/1967 | Jackson et al. | 285—382.7 X |
| 3,336,061 | 8/1967 | Heisler | 285—343 X |

FOREIGN PATENTS 506,965  12/1954  Italy.

THOMAS F. CALLAGHAN, *Primary Examiner.*

U.S. Cl. X.R.

285—348